Jan 6, 1931. M. A. SISK 1,787,645
PIPE FITTING
Filed Jan. 2, 1929
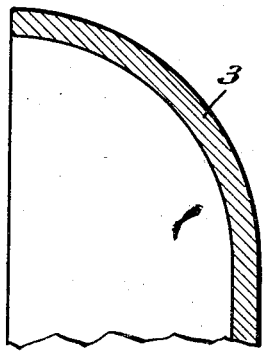
Fig. I.
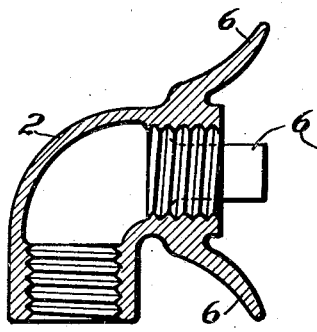
Fig. II.
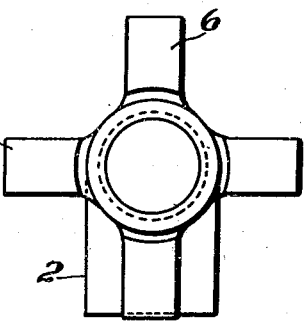
Fig. III.
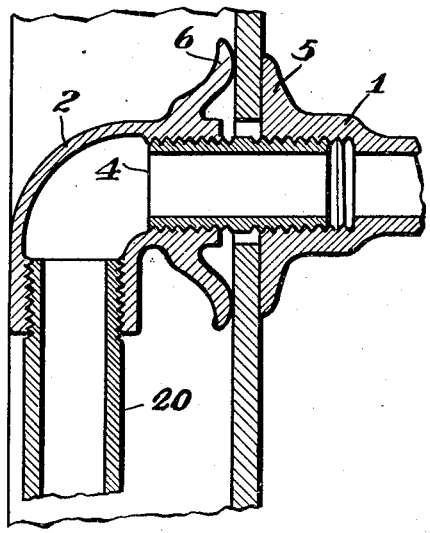
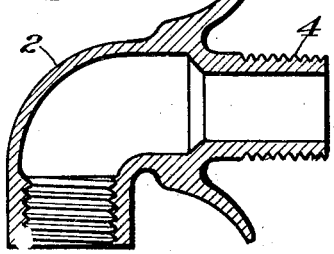
Fig. IV.
WITNESSES
A. B. Wallace.
INVENTOR
Martin A. Sisk
by Christy and Christy
his attorneys Patented Jan. 6, 1931

1,787,645

UNITED STATES PATENT OFFICE

MARTIN A. SISK, OF PITTSBURGH, PENNSYLVANIA

PIPE FITTING

Application filed January 2, 1929. Serial No. 329,821.

My invention relates to improvements in pipe fittings, and consists in a fitting which in simplest manner may be united through an orifice in a supporting plate or wall with a faucet or other fixture, and which will afford a united structure sustained in place securely, snugly, and yet yieldingly. In the yielding feature of the structure adaptability is found, and good jobs of installation may be made under circumstances and conditions which are variable.

The invention is illustrated in the accompanying drawings. Fig. I is a view in vertical section of a water-faucet installation, in which my invention is found. Figs. II and III are views in axial section and in front elevation of the pipe fitting of Fig. I in detached and inactive condition. Fig. IV is a view similar to Fig. II, and illustrates a modification. Referring, first, to Fig. I, a faucet 1, whose basal part alone appears, is shown to be united with a pipe-fitting, in this case an elbow 2, through an orifice in the vertical wall 3 of a sink structure. The elbow 2 is in Fig. 1 shown to be borne by a pipe 20 and so to constitute part of a service line. The union of the faucet with the pipe fitting is a screw-threaded one, and the coupling unit 4 is of such size as to move freely in axial direction in the orifice formed in the wall 3. The coupling unit 4 may be regarded as an extension or continuation either of the faucet 1 or of the pipe fitting 2. In any case, the pipe fitting may be recognized to include a pipe end which in the assembly is brought to axial alignment with the faucet, and is by screw-thread connection drawn toward the faucet.

Both faucet and pipe fitting are provided with flanges, integral with the parts which carry them, and of wider radial extent than the screw-threaded portions over which union is effected, and the flanges are of such extent as to engage and abut upon opposite faces of the supporting wall 3. The flange 5 of the faucet will ordinarily be a continuous flange; its rearward face extends in a plane normal to the axis of the union, or substantially so, and it ordinarily will be a rigid structure. The flange upon the pipe fitting is not continuous circumferentially; it consists of a plurality of radially extending tongues 6. These tongues extend both radially and in an axially longitudinal direction, for the purpose and to the end which will be understood on comparing Figs. I and II. These tongues are formed of flexible and preferably of resilient material. In the assembly, and while the pipe fitting and the faucet are by the screw-threaded union being drawn together on opposite sides of wall 3, the tongues 6 at their tips will engage the rear face of wall 3 while the pipe fitting otherwise is freely responsive to the force tending to move it axially toward the faucet, and as such movement continues the tongues will be deflected and put under tension, and so in the assembly their tension will make secure and snug the mounting of the faucet upon the wall. Inequalities of wall thickness and irregularities of wall surface are ineffective to prevent a firm and secure union; small deviations from true axial alignment of the pipe fitting with faucet are ineffective to prevent snug union.

As shown in Fig. IV the pipe end with which the pipe fitting 2 is provided may be screw threaded externally, instead of internally.

The pipe fitting 2 will conveniently be made of malleable iron or brass, and the tongues 6 may be formed of one substance with it. Hard brass possesses resilience sufficient for the purposes described. If the alternative structure of Fig. V, or that of Fig. VI, be adopted, the ring 7 with its tongues may, if preferred, be made of steel.

In place of a faucet, union similarly may be effected through an orifice plate between a pipe fitting provided with such resilient tongues and a fixture of other sort.

Referring again to Fig. I, it is manifest that the faucet and the pipe fitting, being united in the manner shown and tightened upon opposite sides of wall 3, the resilient tongues 6 are effective to hold the faucet firmly and snugly in place, with compensation in assembly for irregularities and inequalities and imperfect alignment; and as the structure continues in service there is automatic adjustment to accidental and incidental strains, whether due to the settlement of the building, for example, or to thermal expansion and contraction, or to other cause. Always the mounting is secure and snug.

I claim as my invention:

1. In a plumbing installation a service line, a pipe fitting borne by and forming part of such service line and including a screw-threaded pipe end adapted by means of its screw threads to be drawn in the direction of its axis and in a direction toward an orifice in a transversely extending body with which it may be associated at discontinuous points and said pipe end being provided with a plurality of flexible tongues, formed integrally with itself, extending both radially and longitudinally with respect to its axis, spaced apart circumferentially, and adapted to engage the face of such a transversely extending body with which it may be associated at distances from said axis greater than the radius of the pipe end.

2. In a plumbing installation a service line including a pipe fitting, and a fixture, said pipe fitting and said fixture being adapted to be arranged on opposite sides of a supporting plate and to be united one with the other through an opening in such plate, the pipe fitting and fixture engaging one another in a screw-threaded union of lesser radius and the pipe fitting and the fixture being provided each with a flange of greater radius, adapted in the assembly to engage opposite faces of such supporting plate, the flange with which the pipe fitting is provided being discontinuous and consisting of integrally formed flexible tongues extending both radially and longitudinally with respect to the axis of the pipe fitting and adapted in assembly by engagement at discontinuous points with such supporting plate and in cooperation with the flange with which the fixture is provided to constitute a clamp upon such supporting plate.

In testimony whereof I have hereunto set my hand.

MARTIN A. SISK.

CERTIFICATE OF CORRECTION.

Patent No. 1,787,645.  Granted January 6, 1931, to

MARTIN A. SISK.

It is hereby certified that error appears in the printed specification of the above numbered patent requiring correction as follows: Page 2, line 15, claim 1, after the word "associated" insert a comma and strike out the words "at discontinuous points and", and line 15, after the word "associated" insert the words "at discontinuous points and"; and that the said Letters Patent should be read with these corrections therein that the same may conform to the record of the case in the Patent Office.

Signed and sealed this 17th day of February, A. D. 1931.

(Seal)

M. J. Moore,
Acting Commissioner of Patents.